Aug. 7, 1962  F. A. HIGNUTT ETAL  3,048,839
SURVIVOR LOCATOR SYSTEM
Filed April 1, 1955  3 Sheets-Sheet 1

Frank A. Hignutt
Robert F. Hignutt
Henry L. Dequasie
INVENTORS

Frank A. Hignutt
Robert F. Hignutt
Henry L. Dequasie
INVENTORS

Frank A. Hignutt
Robert F. Hignutt
Henry L. Dequasie
INVENTORS

United States Patent Office 3,048,839
Patented Aug. 7, 1962

3,048,839
SURVIVOR LOCATOR SYSTEM
Frank A. Hignutt, Robert F. Hignutt, and Henry L. Dequasie, Millville, N.J., assignors to Delaware Valley Electronics Corporation, Millville, N.J., a corporation of New Jersey
Filed Apr. 1, 1955, Ser. No. 498,612
6 Claims. (Cl. 343—100)

This invention relates to a survivor locator system which employs the use of special radio equipment so as to provide bearing and range data of a survivor's position from certain fixed or mobile stations to thereby enable the rescue of the survivors in a more orderly, convenient, and effective manner.

The primary object of the present invention resides in the provision of means for ensuring the rescue of survivors downed at sea, shipwrecked mariners, and other persons who may have become lost due to disasters and the like thereby reducing the number of deaths due to exposure for failure to locate the survivors in a minimum period of time or to failure to locate the survivor at any time.

The construction of this invention teaches the utilization of a survivor transceiver unit carried by the survivor which is adapted to transmit a signal receivable by a survivor locator station which may be either fixed or mobile and which has equipment thereon for determining both the direction of the signal and its distance from the survivor locator station.

Still further objects and features of this invention reside in the provision of a survivor locator system that is very efficient in operation, effective in use, and which may employ a survivor transceiver unit of durable and compact structure thereby enabling such to be readily attached to life jackets or other emergency gear and to be widely used and distributed to travelers, service personnel, and other persons subjecting themselves to the perils of maritime and aerial navigation.

These, together with the various ancillary objects and features of the invention which will become apparent as the following description proceeds, are attained by this survivor locator system, a preferred embodiment being shown schematically by way of example only in the accompanying drawings, wherein.

Figure 4:
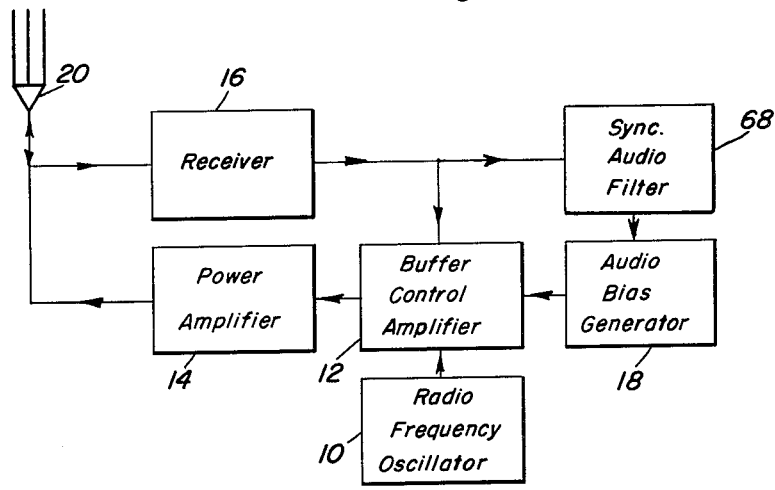
FIGURE 4 is a schematic block diagram of the component elements of the survivor transceiver unit.

With continuing reference to the accompanying drawings wherein like reference numerals designate similar parts throughout the various views, and with initial reference to FIGURE 4 it will be seen that herein there is disclosed the survivor transceiver unit comprising one of the important elements of the present invention. This survivor transceiver unit is adapted to be pinned or otherwise attached to the life jacket, flotation vest, or other emergency equipment or gear of the survivor of a maritime or aerial disaster. The survivor transceiver unit includes a radio frequency oscillator 10 which is a conventional crystal control radio frequency oscillator and determines the frequency of the transmitter. This radio frequency oscillator feeds to a buffer control amplifier 12 that is biased to cut-off at intervals and is used to act as a buffer stage and couples the crystal radio frequency oscillator 10 to a power amplifier 14 and is the stage into which the audio modulation is applied to the transmitter while enabling the receiver portion 16 of the survivor transceiving unit to control the transmitter when necessary.

An audio bias generator 18 is provided to provide two signals to the buffer control amplifier. During one time interval the audio/bias generator generates an audio tone that is used by the buffer control amplifier 12 to modulate the survivor transceiver unit transmitter. During the next time interval, the audio/bias generator 18 provides the buffer control amplifier with a negative voltage that is sufficient to cut-off the amplifier 12. These two conditions follow each other continuously.

The power amplifier 14 consists of a tuned radio frequency power amplifier with a suitable power output to antenna 20. The receiver 16 is tuned to the same frequency as the survivor locator station transmitter. The output of this receiver 16 which is the pulses of the survivor locator system transmitter is fed into the buffer control amplifier 12 and used to control the survivor transceiver unit transmitter.

Figure 5:
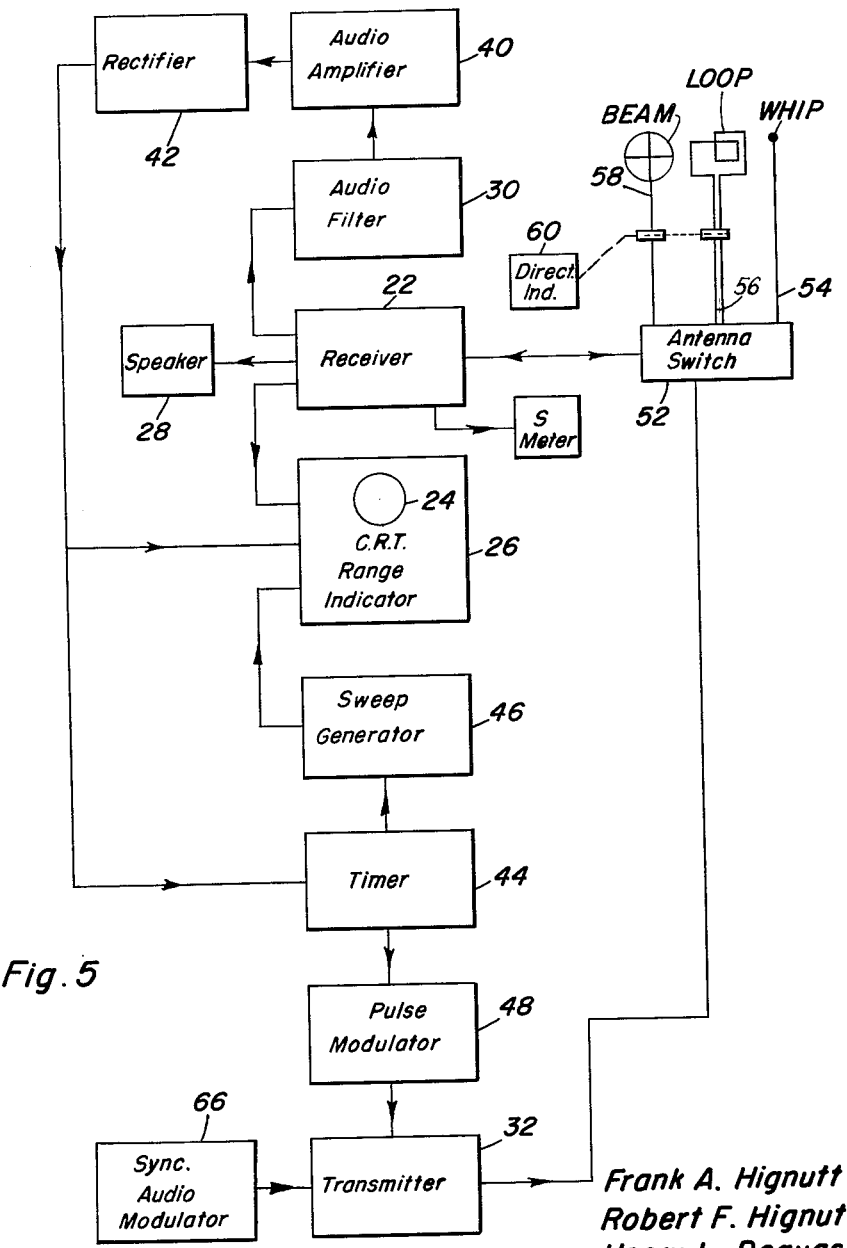
FIGURE 5 is a schematic block diagram of the component elements of the survivor locator station.

Referring now to FIGURE 5 it will be seen that herein shown is the component elements of the survivor locator station. The survivor locator station receiver 22 is tuned to the same frequency as the survivor transceiver unit transmitter. The receiver 22 may be a crystal controlled superheterodyne with a bandwidth sufficient to receive the pulses used by the system. The receiver 22 will have as an output a high impedance wideband output to the vertical deflection system of the cathode ray tube 24 used in the range indicator 26, and an audio frequency output to the speaker 28 as well as to the audio filter 30. The speaker 28 is provided for providing an audible signal to the survivor locator system operator to thereby alert this operator with the audio tones of the distressed survivor transceiver unit and to monitor the survivor transceiver unit while it is in operation.

Figure 6:
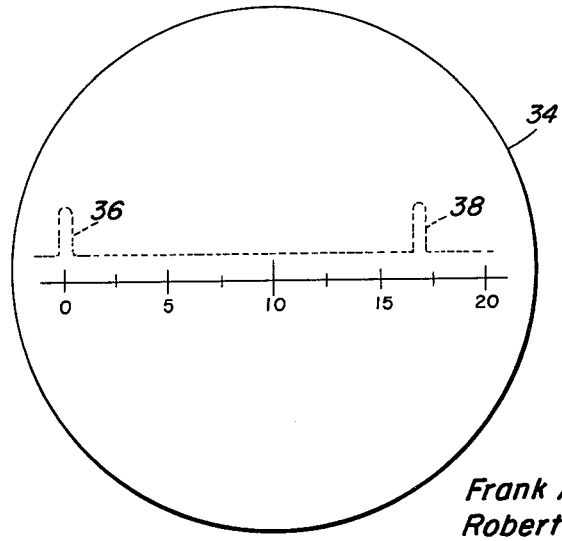
FIGURE 6 is an enlarged diagram illustrating the appearance of the trace on the scope of the range indicator during a range measurement.

The range indicator 26 is a time measuring device employing a cathode ray tube 24 as a display unit. The screen of the cathode ray tube is scanned from left to right by a sweep circuit that is synchronized with the outgoing pulse of the survivor locator system transmitter 32. Part of the transmitted pulse energy is picked up by the survivor locator system receiver 22 and fed to the vertical deflection system of the cathode ray tube 24. This will happen even though the survivor locator system transmitter and receiver operate on different frequencies because of their proximity to each other and the high power level of the transmitter 32. This will cause a vertical deflection of the trace to appear on the left end of the cathode ray scope 34 as at 36, see FIGURE 6. As the cathode ray tube scope 34 is being scanned toward the right, the transmitter pulse is travelling out to the distressed survivor transceiver unit and causing a pulse to be transmitted back to the survivor locator system receiver 22. When this second pulse arrives at the survivor locator station is caused another pip as at 38 to appear on the cathode ray tube scope 34. Since the cathode ray tube scope 34 is being scanned at a constant rate and the pulse signals also travel at a constant rate, the distance between the two pips 36 and 38 will be in proportion to the distance between the survivor locator station and the survivor transceiver unit. The horizontal length of the trace can be calibrated in miles. The scope 34 may have a long persistance screen and after being traced with the same signals many times in succession the image is reinforced and held long enough for the survivor locator station operator to observe the range indicated.

The audio filter 30 is designed to pass the audio frequency signals transmitted by the survivor transceiver units and reject other frequencies. This filter 30 will be adjustable to compensate for slight differences or changes in the audio frequency of the signals from different survivor receiver units. The output of the audio filter is directed into an audio amplifier 40 having an adjustable gain to compensate for the differences in audio voltages at the output of the filter 30 that may occur with varying signal strengths from the survivor transceiver units. An automatic gain control circuit may be utilized and the output of the audio amplifier 40 is fed into a rectifier 42 which produces an output voltage that has an approximately rectangular wave shape and has the proper polarity and sufficient amplitude to perform the following two functions: (1) To cut off the electron beam of the cathode ray tube range indicator 26 during the time that audio signals are being received from a survivor transceiver unit so that the cathode ray tube scope 34 is not marred by the audio or other extraneous signals and possibly obscuring the desired range signals, and (2) to disable or stop the timer 44 thereby preventing the survivor locator station transmitter 32 from operating while the survivor transceiver unit is transmitting its audio signals. The timer 44 contains a stable oscillator followed by wave shaping circuits to provide suitable output pulses to synchronize the sweep generator 46 and to provide an input voltage to the pulse modulator 48. The disabling pulse from the rectifier 42 is used to cut-off an intermediate stage in the timer 44.

The sweep generator 46 and the amplifier circuits necessary to produce the linear horizontal sweep of the cathode ray tube scope 34 functions in the expected manner. The pulse modulator 48 is utilized to amplify and shape the voltage pulses received from the timer 44 and apply them to the transmitter 32. The transmitter 32 is crystal controlled and the pulse modulation applied to the transmitter is applied to one of the stages following the oscillator to maintain best stability.

The transmitter feeds to an antenna switch assembly 52 for connecting the three different types of antennae to the transmitter 32 and receiver 22 as may be necessary and desired. A fixed, resonant, omnidirectional, vertical whip antenna 54 is provided as is a rotatable, directional, loop antenna 56, and a rotatable, directional, beam antenna 58 which has a direction indicator 60 coupled thereto. The antennae 56 and 58 may be mounted on the same mast and be positioned so that their directional characteristics will allow the loop antenna 56 to be in its null or minimum received signal position when the beam is positioned to transmit or receive maximum signal strength in the same direction. The two antennae 56 and 58 will be rotated together by one rotation system and consequently, only one direction indicator 60 is needed.

Figure 1:
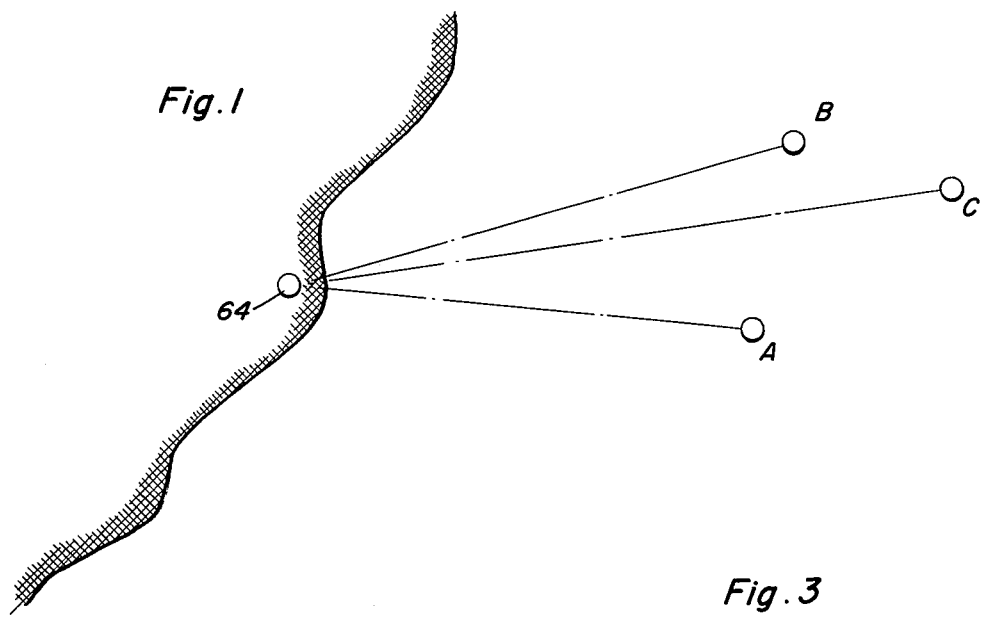
FIGURE 1 is a schematic diagram illustrating a hypothetical emergency situation including a plurality of survivor transceiver units spaced from a survivor locator station.
Figure 3:
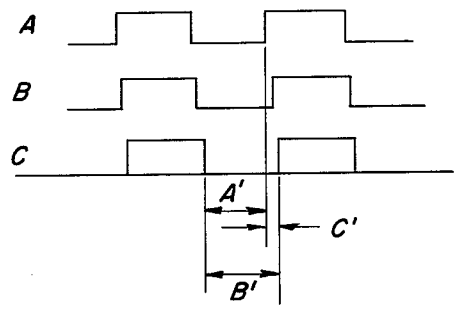
FIGURE 3 is a schematic diagram of the audio signals arriving at the survivor locator station site after the survivor transceiver units have been synchronized.
Figure 2:
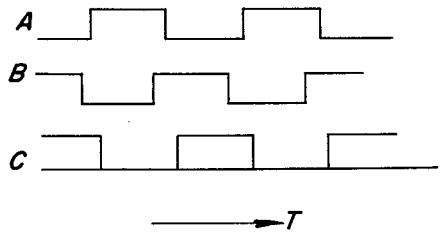
FIGURE 2 is a schematic diagram of the audio signals arriving at a survivor locating station in random order before being synchronized by the survivor locator station unit.

In the event that two or more survivor transceiver units are lying along the same approximate bearing and at the same or different ranges are put into operation at the same time, great difficulty would be encountered in trying to make a range measurement from a survivor locator station position because of the likely random arrival of the survivor transceiver unit audio signals at the survivor locator station receiver. This can be seen best in FIGURE 2 when three survivor transceiver units A, B and C are each transmitting, the survivor locator station 64 will receive pulses as are designated at A, B and C in FIGURE 2 which will utterly prevent an adequate range determination by the operator. During this situation there is no time interval available for a range measurement. However, all of the survivor transceiver units may be synchronized so as to function with each other by using the survivor locator station transmitter which may transmit an audio modulator tone for a period slightly longer than the time interval between the survivor transceiver unit audio signals by providing a synchronizing audio modulator as indicated at 66. The audio generator 18 of each of the survivor transceiver units, see FIGURE 4, may be connected to the receiver 16 through an audio filter 68. This will assure that only the synchronizing audio frequency used to modulate the survivor locator station transmitter would be passed. By an approximate circuit connection, at the end of the transmission of the synchronizing signals, the audio generators of each of the survivor transceiver units 18 would be at the same points in their operating cycles since they are synchronized with each other. The stability of the survivor transceiver unit will be sufficient to maintain the synchronized status long enough for the survivor locator station operator to obtain a range check on each unit. The audio pulses would actually not arrive at the survivor locator station position at the same time if the survivor transceiver units were at different ranges and the time intervals during which their range pulses could be sent by the survivor locator station transmitter would be shortened by the number of micro-seconds difference in the travel time of a radio signal to the closest survivor transceiver unit and back again to the survivor locator station and the time for the same trip to the most distant survivor transceiver unit. This is shown in FIGURE 3 and it will be noticed that herein the pulses from the survivor transceiver units A, B and C are shown synchronized wherein the time interval A' is the comparable period for two or more survivor transceiver units operating together while the prime interval B' represents the time period in which range pulses can be transmitted to a single survivor transceiver unit. The time interval C' is the delay caused by the differences in the distance of the distant and nearest survivor transceiver unit. It is to be noted that the possibility of having several survivor transceiver units operating in the same vicinity and at the same time is one of the reasons for having their receiver and transmitter portions operating at different frequencies. This prevents the units from interfering with each other.

The operation of this survivor locator system is quite simple. With the survivor transceiver unit contained in a case carried on the survivor's person without hinderance to movement thereof, a signal will be transmitted by the transmitter portion of the transceiver unit. Whenever a survivor transceiver unit is put into operation within receiving range of the survivor locator station, an operator on duty at the survivor locator station would hear an interrupted audio tone that is continuously transmitted by the survivor transceiver unit due to the function of the speaker 28. Upon hearing the audio signal from the survivor transceiver unit, the survivor locator station operator will switch the direction finder loop antenna 56 to the survivor locator station received in place of the whip antenna 54 and then determine the bearing of the survivor with respect to the survivor locator station. Next, the beam antenna is switched to the survivor locator station receiver in place of the loop antenna. The beam antenna should now receive maximum signal strength if the beam is pointed to the survivor transceiver unit as it should be. If a minimum signal or no signal is picked up by the beam instead, the antenna system is pointed 180° away from the survivor transceiver unit and the system should be rotated by that amount as a correction. This characteristic of the beam and loop antenna system provides a safe guard against a 180° ambiguity in bearings. Next the operator will key the survivor locator system transmitter through a special timer circuit. The survivor locator station transmitter 32 operates on the same frequency as the receiver portion 16 of the survivor transceiver unit. The survivor locator system transmitter 32 will transmit short, powerful, periodic pulses of radio frequency energy in the direction of the survivor transceiver unit being located. The timer circuit of the survivor locator system allows these pulses to be transmitted only during the time intervals that the survivor transceiver unit is not transmitting an audio signal. The duration of these pulses from the survivor locator system transmitter 32 is very short compared to the time elapsing between the pulses. Also, the time elapsing between the survivor locator station transmitter pulses is short compared to the time intervals between the audio signals transmitted by the survivor transceiver unit. This timing allows several hundred pulses to be transmitted by the survivor locator station transmitter between the audio signals transmitted by the survivor transceiver unit. The pulses of the survivor locator station transmitter 32 are received by the receiver portion 16 of the survivor transceiver unit. This receiver 16 through the special control circuit provided therefor causes the transmitter of the survivor transceiver unit to transmit a pulse of radio frequency energy on the operating frequency of the survivor transceiver unit's transmitter. This pulse is received by the survivor locator station receiver 22. The time that elapses between the time that the survivor locator station pulse is sent out and the time that the pulse is received from the survivor transceiver unit is a function of the distance between the survivor locator station and the survivor transceiver unit. This time interval can be accurately measured on the cathode ray tube scope 34.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A system for determining the bearing and range of a plurality of substations with reference to a locator station comprising
   a plurality of transceiver units each of which is located at one of said substations,
   a locator station spaced from said substations,
   each of said transceiver units including a first transmitter adapted to broadcast a first signal pattern and a second signal pattern both said first and said second signal patterns being a train of signals having a first carrier frequency, said first signal pattern being substantially different than said second signal pattern,
   said locator station including a second transmitter adapted to broadcast a third signal pattern and a fourth signal pattern, both of said third and said fourth signal patterns having a second carrier frequency different from said first carrier frequency, said third signal pattern being a train of signals having a repetition rate equal to that of said second signal pattern broadcast by said first transmitter, said fourth signal pattern being a second carrier frequency signal, each of said transceiver units including a first receiver adapted to receive signals having said second carrier frequency,
   said locator station including a second receiver adapted to receive signals having said first carrier frequency,
   antenna means at said locator station responsive to said first signal pattern broadcast by said first transmitter to provide a determination of the bearing of each of said substations with respect to said locator station,
   coupling means at each of said transceivers for responsively coupling said first transmitter to said first receiver whereby each signal of said third signal pattern broadcast by said second transmitter when received by said first receiver will cause said first transmitter to broadcast a corresponding return signal thereby forming said second signal pattern,
   range means at said locator station responsive to the elapsed time between the broadcast by said second transmitter of one of said signals of said third signal pattern and the receipt at said second receiver of the corresponding one of said signals of said second signal pattern to provide an indication of the distance between said locator unit and each of said substations,
   and synchronizing means to provide said fourth signal pattern broadcast by said second transmitter at said locator station and to cause said fourth signal to substantially synchronize the phase of said first signal patterns at each of said substations.

2. A system for determining the bearing and range of a plurality of substations with reference to a locator station comprising
   a plurality of transceiver units each of which is located at one of said substations,
   a locator station spaced from said substations,
   each of said transceiver units including a first transmitter adapted to broadcast a first signal pattern and a second signal pattern both of said first and second signal patterns being a train of signals having a first carrier frequency, said first signal pattern having a predetermined repetition rate, said second signal pattern being a series of pulses having a pulse repetition rate substantially greater than said repetition rate of said first signal pattern,
   said locator station including a second transmitter adapted to broadcast a third signal pattern and a fourth signal pattern, both of said third and said fourth signal patterns having a second carrier frequency different from said first carrier frequency, said third signal pattern being a series of pulses having a pulse repetition rate equal to that of said second signal pattern broadcast by said first transmitter, said fourth signal pattern being an audio modulated second carrier frequency signal, each of said transceiver units including a first receiver adapted to receive signals having said second carrier frequency,
   said locator station including a second receiver adapted to receive signals having said first carrier frequency,
   antenna means at said locator station responsive to said first signal pattern broadcast by said first transmitter to provide a determination of the bearing of each of said substations with respect ot said locator station,
   coupling means at each of said transceivers for responsively coupling said first transmitter to said first receiver whereby each pulse of said third signal pattern broadcast by said second transmitter when received by said first receiver will cause said first transmitter to broadcast a corresponding return pulse thereby forming said second signal pattern,
   range means at said locator station responsive to the elapsed time between the broadcast by said second transmitter of one of said pulses of said third signal pattern and the receipt at said second receiver of the corresponding one of said pulses of said second signal pattern to provide an indication of the distance between said locator unit and each of said substations,
   and synchronizing means to provide said fourth signal pattern broadcast by said second transmitter at said locator station and to cause said fourth signal pattern to substantially synchronize the phase of said first signal patterns at each of said substations.

3. A survivor locator system for determining the bearing and range of survivors with reference to a station spaced from the survivors comprising
   a plurality of survivor transceiver units each of which is adapted to be carried by one of said survivors,
   a survivor locator station spaced from said survivors,
   each of said survivor transceiver units including a first transmitter adapted to broadcast signals at a first predetermined frequency and a first receiver to receive signals at a second predetermined frequency different from said first frequency, said survivor locator station including a second transmitter adapted to broadcast signals at said second predetermined frequency and a second receiver to receive signals at said first predetermined frequency, control means at each of said survivor units for on-off control of said first transmitter to provide the broadcasting of a train of signals having a predetermined repetition rate and having said first frequency as a carrier frequency, antenna means at said locator station responsive to said train of signals broadcast by said first transmitter to provide a determination of the bearing of each of said survivor units with respect to said locator station, pulsing means at said locator station to cause said second transmitter to broadcast a series of pulses having said second frequency as a carrier frequency and having a pulse repetition rate substantially greater than the repetition rate of said train signals broadcast by said first transmitter, coupling means at said survivor units for responsively coupling said first transmitter to said first receiver whereby each of said pulses broadcast by said second transmitter when received by said first receiver will cause said first transmitter to broadcast a pulse having said first frequency as a carrier frequency, range means at said locator station responsive to the elapsed time between the transmission of one of said pulses from said second transmitter and the receipt at said second receiver of the return corresponding pulse from said first transmitter of each of said survivor units to provide an indication of the distance between said locator unit and each of said survivor units, and synchronizing means to provide a second frequency signal broadcast by said second transmitter at said locator station and to cause said second frequency signal to synchronize said control means at each of said survivor units to assure that each of said train of signals will be at substantially the same point in its operating cycle.

4. A survivor locator system for determining the bearing and range of survivors with reference to a station spaced from the survivors comprising a plurality of survivor transceiver units each of which is adapted to be carried by one of said survivors, a survivor locator station spaced from said survivors, each of said survivor transceiver units including a first transmitter adapted to broadcast signals at a first predetermined frequency and a first receiver to receive signals at a second predetermined frequency different from said first frequency, said survivor locator station including a second transmitter adapted to broadcast signals at said second predetermined frequency and a second receiver to receive signals at said first predetermined frequency, control means at each of said survivor units for on-off control of said first transmitter to provide the broadcasting of a train of signals having a predetermined repetition rate and having said first frequency as a carrier frequency, antenna means at said locator station responsive to said train of signals broadcast by said first transmitter to provide a determination of the bearing of each of said survivor units with respect to said locator station, pulsing means at said locator station to cause said second transmitter to broadcast a series of pulses having said second frequency as a carrier frequency and having a pulse repetition rate substantially greater than the repetition rate of said train of signals broadcast by said first transmitter, coupling means at said survivor units for responsively coupling said first transmitter to said first receiver whereby each of said pulses broadcast by said second transmitter when received by said first receiver will cause said first transmitter to broadcast a corresponding return pulse having said first frequency as a carrier frequency, range means at said locator station responsive to the elapsed time between the transmission of one of said pulses from said second transmitter and the recepit at said second receiver of said corresponding return pulse from said first transmitter of each of said survivor units to provide an indication of the distance between said locator unit and each of said survivor units and synchronizing means to provide an audio modulated second frequency signal broadcast by said second transmitter at said locator station and to cause said second frequency signal to synchronize said control means at each of said survivor units to assure that each of said train of signals will be at substantially the same point in its operating cycle, said audio modulated second frequency signal being continuously on for a time period greater than the periods of each signal of said train of signals broadcast by said first transmitter.

5. A survivor locator system for determining the bearing and range of survivors with reference to a station spaced from the survivors comprising a plurality of survivor transceiver units each of which is adapted to be carried by one of said survivors, a survivor locator station spaced from said survivors, each of said survivor transceiver units including a first transmitter adapted to broadcast signals at a first predetermined frequency and a first receiver to receive signals at a second predetermined frequency different from said first frequency, said survivor locator station including a second transmitter adapted to broadcast signals at said second predetermined frequency and a second receiver to receive signals at said first predetermined frequency, control means at each of said survivor units for on-off control of said first transmitter to provide the broadcasting of a train of signals having a predetermined repetition rate and having said first frequency as a carrier frequency, antenna means at said locator station responsive to said train of signals broadcast by said first transmitter to provide a determination of the bearing of each of said survivor units with respect to said locator station, pulsing means at said locator station to cause said second transmitter to broadcast a series of pulses having said second frequency as a carrier frequency and having a pulse repetition rate substantially greater than the repetition rate of said train of signals broadcast by said first transmitter, coupling means at said survivor units for responsively coupling said first transmitter to said first receiver whereby each of said pulses broadcast by said second transmitter when received by said first receiver will cause said first transmitter to broadcast a corresponding return pulse having said first frequency as a carrier frequency, range means at said locator station responsive to the elapsed time between the transmission of one of said pulses from said second transmitter and the receipt at said second receiver of said corresponding return pulse from said first transmitter of each of said survivor units to provide an indication of the distance between said locator unit and each of said survivor units, cut-off timing means coupled to said pulse means for cutting off the broadcasting of said second transmitter series of pulses during the time period when each signal of said train of signals broadcast by said first transmitter is received by said second receiver, and synchronizing means to cause an audio modulated second frequency signal broadcast by said second transmitter at said locator station and to cause said second frequency signal to synchronize said control means at each of said survivor units to assure that each of said train of signals will be at substantially the same point in its operating cycle, said audio modulated second frequency signal being continuously on for a time period greater than the on time periods of said train of signals broadcast by said first transmitter.

6. A method for determining the bearing and range of survivors with reference to a station spaced from the survivors comprising broadcasting a first train of signals having a first carrier frequency from each one of a first signal source carried by each survivor, receiving said first train of signals at said station, adjusting the reception of said first train of signals by the use of directional antenna whereby the bearings of each survivor may be ascertained, broadcasting a second train of signals having a second carrier frequency from a second signal source at said station, said train of signals being a series of pulses having a repetition rate substantially greater than the repetition rate of said first train of signals, receiving said second train of signals at each one of a receiver carried by each survivor, broadcasting a third train of signals at said first carrier frequency from each said first signal source in response to the receipt of said second train of signals by each survivor, said third train of signals being a series of pulses wherein each pulse is a response to the receipt of a corresponding pulse from said second train of signals, receiving said third train of signals at said station, measuring the time lapse between the broadcasting of a pulse in said second train of signals and the receiving of the corresponding pulse in said third train of signals whereby the range of each survivor may be ascertained, broadcasting a fourth signal having said second carrier frequency from said second signal source, receiving said fourth signal at each said receiver carried by each survivor, and synchronizing the phase of each of said first train of signals by using said fourth signal to control the broadcasting of said first train of signals.

References Cited in the file of this patent

UNITED STATES PATENTS

| | | |
|---|---|---|
| 2,208,378 | Luck | July 6, 1940 |
| 2,412,703 | Wolff | Dec. 17, 1946 |
| 2,517,540 | Busignies | Aug. 8, 1950 |
| 2,531,433 | Hoffman | Nov. 28, 1950 |
| 2,561,421 | Seale | July 24, 1951 |
| 2,568,265 | Alvarez | Sept. 18, 1951 |
| 2,595,141 | Herbst | Apr. 29, 1952 |
| 2,689,953 | Litchford et al. | Sept. 21, 1954 |
| 2,845,621 | Hasbrook | July 29, 1958 |

FOREIGN PATENTS

| | | |
|---|---|---|
| 717,721 | Great Britain | Nov. 3, 1954 |